United States Patent [19]

Lindén

[11] Patent Number: 4,538,292
[45] Date of Patent: Aug. 27, 1985

[54] DENTAL INSTRUMENT FOR OPTIMAL POSITIONING OF AN X-RAY FILM SUPPORT

[76] Inventor: Enok S. R. Lindén, Teatergatan 34, S-582 22 Linköping, Sweden

[21] Appl. No.: 505,035
[22] PCT Filed: Oct. 11, 1982
[86] PCT No.: PCT/SE82/00326
 § 371 Date: Jun. 14, 1983
 § 102(e) Date: Jun. 14, 1983
[87] PCT Pub. No.: WO83/01564
 PCT Pub. Date: May 11, 1983

[30] Foreign Application Priority Data
Nov. 6, 1981 [SE] Sweden ............................... 8106601

[51] Int. Cl.³ .................... A61B 6/14; A61C 19/00; G03B 41/16
[52] U.S. Cl. ..................................... 378/169; 378/170
[58] Field of Search ................ 378/167, 168, 169, 170

[56] References Cited

U.S. PATENT DOCUMENTS 1,698,795 1/1929 Hillman ............................... 378/170
2,123,210 7/1938 Schantz ............................... 378/170
2,831,978 4/1958 Narvestad ........................... 378/170

FOREIGN PATENT DOCUMENTS 919907 11/1954 Fed. Rep. of Germany ...... 378/169

Primary Examiner—Craig E. Church
Assistant Examiner—Charles Wieland
Attorney, Agent, or Firm—Sughrue, Mion, Zinn, Macpeak, and Seas

[57] ABSTRACT

A bite block integral with an X-ray film support and extending generally at right angles to the X-ray film support to one side thereof, is formed of upper and lower flat plate portions, one which is integral with the film support, with the other being spaced from said one flat plate portion, normally parallel thereto and connected thereto by means permitting pivoting of the upper plate portion relative to the second about an axis perpendicular to the plane of bite, when positioned in the mouth of the patient between upper and lower tooth rows. An integral bridge may form the pivot axis for the upper and lower plate portions, a rotatable sleeve may effect such pivot connection with the sleeve being shiftable laterally between the upper and lower plate portions. Rectangular block wings may be detachably mounted to respective sides of the bite block plate portions via flanges which are inserted within the gap between the plates to respective sides of the pivot axis between the plates for the bite block.

6 Claims, 5 Drawing Figures

DENTAL INSTRUMENT FOR OPTIMAL POSITIONING OF AN X-RAY FILM SUPPORT

BACKGROUND OF THE INVENTION

The present invention relates to a dental instrument comprising an X-ray film support connected to a bite block and, preferably, also an aligning rod. In prior art instruments of the type above defined the bite block is homogeneous and its top surface is parallel to its bottom. When a patient opens his mouth, the lower jaw swings around the jaw-joints. This means that an arbitrary point on the lower jaw substantially moves along a circular arc the radius of which equals the distance of the point from an axis through the jaw-joints. Consequently, the farther back the bite block has to be located, the greater will be the aperture angle of the jaws. It follows that, when a bite block has been inserted between the upper and lower tooth rows of a patient and the latter has, obeying the instructions of his dentist, again closed his mouth, only the rearmost teeth will contact the bite block whereas a vertical distance will be left between the block and the upper or lower teeth at the front edge of the block. The lack of contact between the bite block and all teeth overlying it means that it assumes an unstable position and may easily move in response to variations of the bite pressure exerted by a patient. Such movements lead to a displacement of the film support and hence of the film. As is understood, such a swinging movement of the bite block can occur both around an axis parallel to that of the jaw-joints and along a horizontal axis parallel thereto.

The instability problem above referred to is aggravated in the following two situations. The one situation is when the rearmost molars are to be X-rayed. In order for the bite block to be received between the teeth the patient then has to open his mouth that much that the only contact between the teeth and the bite block will be at the rear edge of the latter. The second situation is when one or more teeth are missing, so that even when the frontal teeth are to be X-rayed the bite block does not get sufficient support.

The X-raying of the frontal teeth involves a further difficulty. Due to the anatomy of the palate, the film, and consequently also the film support, will be pressed downwards which often leads to exclusion from the picture of the tissue regions around the teeth roots. When the frontal teeth of the lower jaw are X-rayed the tongue of the patient causes corresponding problems. For that reason conventional film supports can normally not be used in these regions.

The main object of the invention is to provide a dental instrument in which the problems above referred to are eliminated, meaning that once the patient has pressed his teeth against the bite block the latter will securely be retained in the position selected by the dentist.

Other objects and advantages of the invention will appear from the description and the drawings which illustrate three different embodiments.

DESCRIPTION OF PREFERRED EMBODIMENTS

Figure 1:
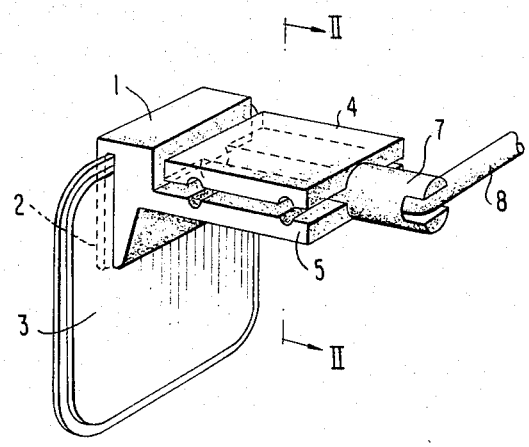
FIG. 1 is a perspective view showing an instrument according to the first embodiment.
Figure 2:
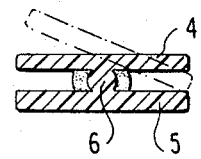
FIG. 2 is a cross-section taken along line II—II in FIG. 1.

The instrument shown in FIGS. 1 and 2 substantially consists of a film support 1 with a groove or recess 2 for the film 3. Film support 1 is integral with a bite block. The device sofar described represents prior art. However, according to the present invention, the bite block consists of two generally flat plate portions, hereinafter referred to as the upper portion 4 and the lower portion 5. The lower portion 5 is integral with the film support. Between block portions 4 and 5 there is a shallow gap. Further, upper portion 4 and lower portion 5 are spaced from each other except centrally, where they are interconnected via a thin bridge portion 6. In the embodiment shown in FIGS. 1 and 2 film support 1, the lower block portion 5, bridge 6 and the upper portion 4 form an integral unit. However, block portion 4 is not connected to support 1 at its inner end—to the left in FIG. 1.

The operation of the instrument above described is as follows. The narrow bridge 6 serves as a pivot, i.e. the two portions of the bite block may turn around it and, as has been indicated in FIG. 2, the corresponding angle is substantial. When a bite block according to the invention is introduced between the tooth rows of a patient and the latter bites into the block the two portions thereof will automatically assume such angular positions that each of them is parallel with a plane through the chewing surfaces of the adjacent tooth row or, in other words, each tooth row will in at least two points contact the adjacent bite block portion. Consequently, instead of the instable mounting position which, as has been explained above, exists in prior art instruments the film will be retained in the position selected by the dentist before he leaves the patient during the film exposure. The corresponding advantage has several aspects. Naturally, the primary aspect is that the dentist knows that the region he intends to X-ray will appear on the film. This avoids the need for repetitions of any given exposure. It should be appreciated that such repetitions are not only time-consuming and costly but that, in addition thereto, most patients find them irritating and embarrassing. A second consequence of the stable positioning of the film is a protection against movements which yields sharp and clear pictures.

In the embodiment according to FIGS. 1 and 2 at the end of bridge 6 remote from film support 1 there is a sleeve 7 adapted to receive an aligning rod 8.

In FIG. 1 the instrument has been shown in the position it would assume during X-raying of teeth in the lower jaw. When teeth or tissues in the upper jaw are to be X-rayed, the instrument is rotated by 180 degrees so that the film 3 will instead be directed upwards.

Figure 3:
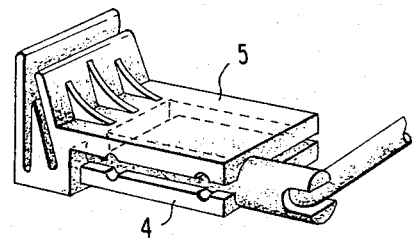
FIG. 3 is a perspective view showing an instrument according to a second embodiment.
Figure 4:
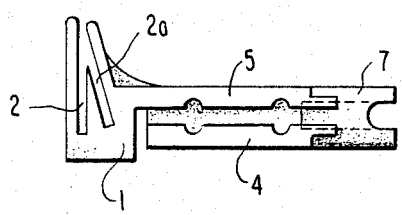
FIG. 4 shows the instrument of FIG. 3 in a lateral view.

There are two differences between the embodiment shown in FIGS. 3 and 4 and the one sofar described.

The one difference is that the film support 1 has two grooves 2 and 2a adapted to receive the film 3. As was the case in FIG. 1, groove 2 is located in a plane perpendicular to planes through the top and bottom surfaces of the bite block. In contrast thereto, groove 2a is obliquely oriented relative to the first-mentioned plane.

This means that, when groove 2a receives an X-ray film, the vertical distance between the upper and lower edges of the film will be reduced which is advantageous when due to the anatomy conditions it is difficult to accommodate a film having a greater height. Knowing the angle between grooves 2 and 2a the dentist may compensate for that angle by setting up the X-ray camera so that its focal axis will form the same angle with the aligning rod 8.

The second difference is that sleeve 7 is not integral with the bite block. Instead, the two portions 4 and 5 of the bite block do at their free edges opposite the film support have flanges 9 and 10 engaging corresponding grooves in sleeve 7. This arrangement makes it possible laterally to move the sleeve along said flanges. Further there is no counterpart to bridge portion 6 in FIG. 2 meaning that the movable block portion 4 is connected to sleeve 7 only. Consequently, when sleeve 7 is in an extreme position as shown in FIG. 3, the turning axis will be located at the one side of the block instead of centrally. The corresponding advantage is that the film can be brought into positions deeper back into the mouth than is possible when the aligning rod is centrally located which is valuable when the rearmost molars are to be X-rayed.

Figure 5:
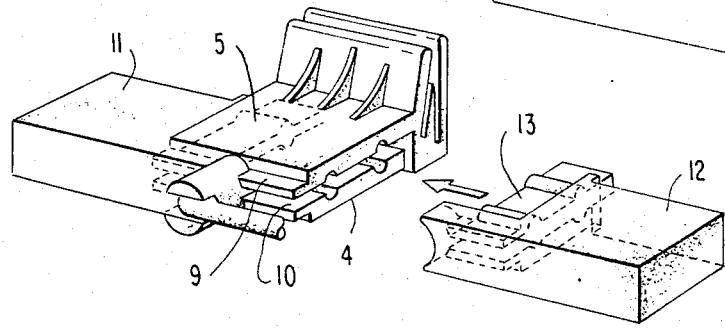
FIG. 5 is a perspective view illustrating the third embodiment.

The instrument shown in FIG. 5 has been supplemented with wing-like lateral pieces 11 and 12 which may detachably be connected to bite block 4, 5. They extend the bite block in the direction of the tooth row which is of special value when front teeth are to be X-rayed. This is due to the fact that the film may now be positioned so that the parallel technique rather than the bisecting-angle technique can be utilized. The side wings have flanges 13 protruding into the space between block portions 4 and 5 and retained there by a snapping action.

It should be observed that the invention has many embodiments differing from those here described for exemplifying purposes only. The inventive idea resides in the realization that the bite block should be arranged so that its cross-section may vary between substantially rectangular and substantially wedge-shaped form, the corresponding principle being illustrated in FIG. 2. There are several other ways in which such a deformation may be obtained. It should especially be pointed out that the "axis" around which portions 4 and 5 turn does not have to be a concrete portion of the instrument. Any bite block which is deformable as above described falls within the scope of the invention.

The bite block may, in a manner known per se, be provided with markings making it possible for the dentist (by reference to one or more teeth) to ascertain that upon repeated X-raying of one and the same portion of the jaw the film will always assume the same position so that all exposures become completely mutually comparable.

I claim:

1. In a dental instrument for positioning of an X-ray film for X-raying of teeth or adjacent tissues, said dental instrument comprising an X-ray film support, a bite block integral with said film support and extending to one side thereof and generally perpendicular thereto to the plane of the X-ray film supported thereby, and an alignment rod coupled to said bite block for adjusting the position of the bite block relative to the film support, the improvement wherein said bite block comprises:

upper and lower flat plate portions spaced from each other, forming a gap,
   one of said portions being integral with said film support extending outwardly therefrom and generally perpendicular to the plane of the X-ray film,
   the other portion being generally parallel to said one portion, and
   means for pivotably connecting said upper and lower plate portions at said gap for pivoting about an axis perpendicular to the plane of the X-ray film, and the plane of bite defined by the tooth rows contacting the top of the upper plate portion and the bottom of the lower plate portion of the bite block,
   and wherein the plate portion of said bite block not integral with the film support, is free of said other portion except at said pivot connection therebetween, permitting the two plate portions to automatically assume such angular positions that each of them is parallel with a plane through the chewing surfaces of the adjacent tooth row to insure that once the teeth have been clamped to the bite block plate portions, the bite block and the X-ray film support are securely retained in the position selected by the dentist.

2. The dental instrument as claimed in claim 1, wherein said means for pivotally connecting said plate portions of said bite block comprises an integral bridge extending perpendicularly to the X-ray film support, centered within said gap separating said upper and lower plate portions.

3. The dental instrument as claimed in claim 2, further comprising a rotatable sleeve connected to said bite block at the end of said bridge, remote from said film support, and wherein said alignment rod is connected to said sleeve for rotation of said sleeve about its axis and coaxially of said bridge.

4. The dental instrument as claimed in claim 1, wherein said means for pivotally connecting said upper plate portion of said bite block to said lower plate portion comprises a cylindrical sleeve connected at one end to said upper and lower bite block plate portions, maintaining said plate portions normally coplanar and separated from each other, and wherein said alignment rod is coupled to said rotatable sleeve at its end remote from said bite block plate portions.

5. The dental instrument as claimed in claim 4, wherein said rotatable sleeve is slidably mounted at said one end to the ends of said bite block upper and lower plate portions remote from said X-ray film support for movement parallel to the X-ray film support, such that the pivot axis between said upper and lower plate portions may be variably set throughout the width of said bite block.

6. The dental instrument as claimed in claim 1, further comprising a pair of rectangular block form wings, said wings including flanges projecting from given ends thereof and insertably received within said gap between said upper and lower bite block plate portions so as to detachably connect said wings to respective sides of said bite block for enlarging the bite surface area, as provided by the upper and lower plate portions of the bite block.

* * * * *